(No Model.)

C. LEHMAN.
NUT LOCK.

No. 522,906. Patented July 10, 1894.

WITNESSES

Charles Lehman
INVENTOR by
Attorney

UNITED STATES PATENT OFFICE.

CHARLES LEHMAN, OF JOHNSTOWN, PENNSYLVANIA.

NUT-LOCK.

SPECIFICATION forming part of Letters Patent No. 522,906, dated July 10, 1894.

Application filed October 26, 1893. Serial No. 489,207. (No model.)

*To all whom it may concern:*

Be it known that I, CHARLES LEHMAN, a citizen of the United States of America, residing at Johnstown, in the county of Cambria and State of Pennsylvania, have invented certain new and useful Improvements in Nut-Locks; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to improvements in lock-washers for nut-locks; and it consists in the combination with a bolt and nut of ordinary construction of a concavo-convex or dished washer the diameter of the aperture of which is the same or slightly larger than the diameter of the bolt to which it is applied, the width of the lock-washer being of a greater width than the nut, such a washer being provided on its inner edge with angular projections or teeth which are positioned equi-distant from each other and project to such an extent that when the washer is flattened by the nut they will be forced into the bolt below the base of the threads thereof so as to hold the washer in positive engagement with the bolt, the said washer having on its periphery a projection or projections one side edge of which radiates from the center of the washer while the other is at a tangent therewith, substantially as shown, so that when the nut is forced home the end of the projection or point formed by the tangential edge will not be forced in intimate contact with the fish-plate or other object upon which the parts are used, so that a suitable tool may be inserted beneath the projecting portion of the washer for bending said portion in engagement with the side of the nut, and the nut being of less diameter than the washer it is essential that the projecting portion be bent as shown as will be hereinafter fully set forth and specifically pointed out in the claim.

Figure 1:
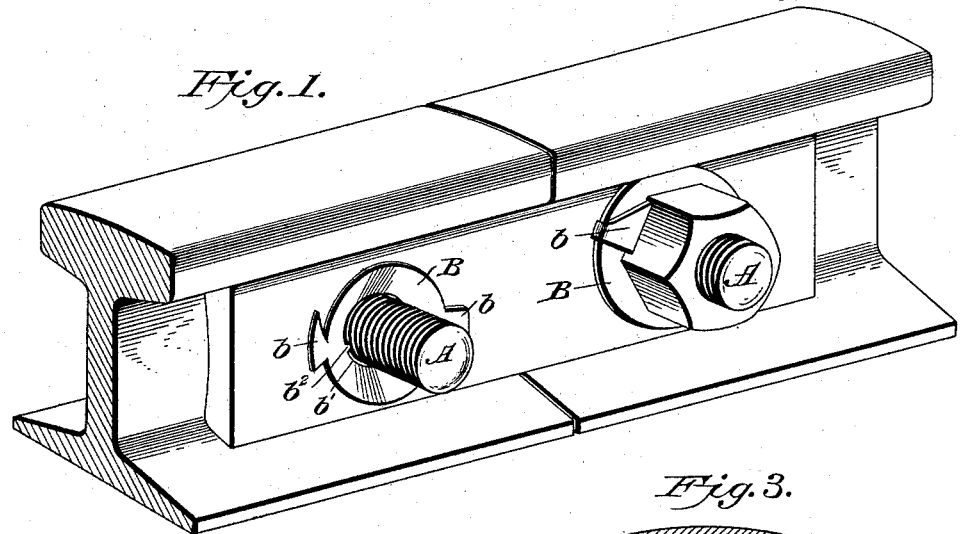
Figure 2:
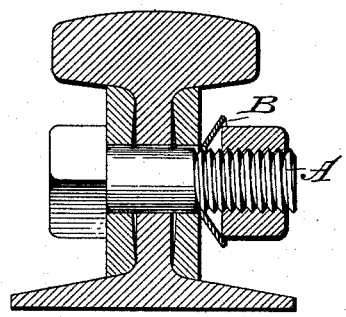
Figure 3:
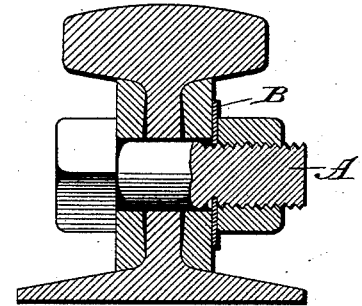
Figure 4:
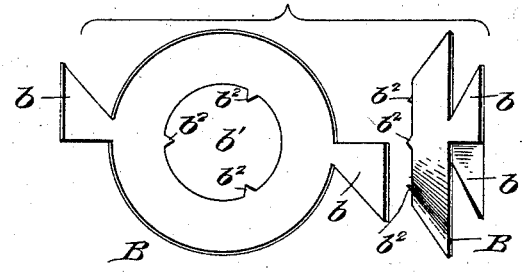

In the accompanying drawings, Figure 1 its a perspective view showing the washer applied. Figs. 2 and 3 are sectional views, and Fig. 4 a detail view of the washer.

A designates the bolt which is of ordinary construction and to which the lock-washer B is adapted to be applied. The washer is stamped or cut from a flat piece of sheet metal to provide an extension, or extensions, $b$ one of the side edges of which radiates from the center of the washer while the other is at a tangent therewith, this shape providing an extension which increases in width from the periphery of the washer. Within the aperture $b'$ of the washer extend angular projections or teeth $b^2$, and these teeth are positioned equi-distant from each other and project rigidly from the inner edge of the washer.

In making the washer from a flat piece of metal the gage or size of the parts is determined by the bolt upon which the washer is to be used and the diameter of the aperture $b'$ is such that when the washer is flat it is of the same diameter as the diameter of the bolt, but the teeth $b^2$ should project to such an extent that the washer when flat cannot be applied to the bolt—the teeth being longer than the depth of the threads. After the blank is cut it is dished so as to be concavo-convex in which form the diameter of the aperture $b'$ is enlarged and the teeth $b^2$ inclined so that the washer can be placed upon the threaded portion of the bolt either turning it or rocking it to permit the teeth $b^2$ to pass over the threads.

After the washer has been applied the nut is turned down upon the bolt and washer and by applying sufficient force the washer will be flattened which will reduce the diameter of the aperture $b'$ and cause the rigid teeth $b^2$ to be forced into the body of the bolt at the base of the threads. This holds the bolt against displacement and at the same time exerts a pressure upon the inner face of the nut.

When the nut and washer are in place the projection $b$, especially the point at the end of the edge at a tangent with the washer, will retain to a sufficient degree the dished shape so that it will not lie immediately against the fish-plate, and when the nut which is of a smaller size than the diameter of the washer a suitable tool or implement may be readily passed under the projection and the narrow part of the same adjacent to the washer can be easily bent so that the straight outer edge of said projection will bear against one side of the nut to lock it securely in place.

As herefotore stated it is essential that the bolt and washer should be of the proper gage but it will be noted that the size of the nut can vary.

In dishing the washer it is preferred to give the same an inclination which will coincide with the pitch of the threads of the bolt.

Having thus described my invention, what I claim as new, and desire to secure by Letters Patent, is—

As an improved article of manufacture, a nut locking washer adapted for use with bolts and nuts of the standard type, the washer being made up of a single plate which has a central aperture of greater diameter than the bolt and teeth $b^2$ which are adapted to be forced into the body of the bolt to connect the washer fixedly and permanently thereto, the outer edge of the washer having members $b$ which are connected to the washer by a narrow connecting portion, the whole being dished so as to be concavo-convex in its merchantable shape and constructed to be flattened in use by pressure of the nut on the concave face, the projecting portions being adapted to be bent at the narrow connecting portion so that the outer edge will engage with one of the sides of the nut, substantially as shown.

In testimony whereof I affix my signature in presence of two witnesses.

CHARLES LEHMAN.

Witnesses:
LEVI J. FOUST,
GEORGE KUNKEL.